United States Patent [19]
Wilson et al.

[11] Patent Number: 5,340,471
[45] Date of Patent: Aug. 23, 1994

[54] PORTABLE COOKING OIL FILTER APPARATUS

[76] Inventors: Mark L. Wilson, P.O. Box 7, Pac 1 t, S.C. 29372; J. Michael Williams, 104 Glasgow Ct., Greenville, S.C. 29607

[21] Appl. No.: 8,154
[22] Filed: Jan. 25, 1993
[51] Int. Cl.⁵ .............................. B01D 29/66
[52] U.S. Cl. ...................... 210/167; 210/416.5; 99/418
[58] Field of Search ............ 210/167, 168, 416.1, 210/416.5, 175, 181, 186; 99/408, 418

[56] References Cited

U.S. PATENT DOCUMENTS

| | | | |
|---|---|---|---|
| 2,477,404 | 7/1949 | Butt, Jr. | 210/185 |
| 3,630,361 | 12/1971 | Keating | 210/167 |
| 3,707,807 | 1/1973 | Wilson et al. | 99/408 |
| 4,444,095 | 4/1984 | Anetsberger et al. | 99/408 |
| 4,513,614 | 4/1985 | Adcock | 210/168 |
| 4,622,135 | 11/1986 | Williams | 210/167 |
| 4,668,390 | 5/1987 | Hurley et al. | 210/167 |
| 4,768,426 | 9/1988 | Nett | 210/167 |
| 4,959,144 | 9/1990 | Bernard et al. | 210/232 |
| 4,974,501 | 12/1990 | Grob et al. | 99/408 |

*Primary Examiner*—Robert A. Dawson
*Assistant Examiner*—W. L. Walker
*Attorney, Agent, or Firm*—Henry Jaudon; Cort Flint

[57] ABSTRACT

A portable cooking oil filtering apparatus for cleaning cooking oil which includes a tank having a top and a bottom, for receiving soiled cooking oil. A pump assembly, which includes a reversible pump and piping connecting with the tank through an opening and to the reversible pump allows pumping of soiled cooking oil into and out of the tank. A frame is provided which includes a pair of wheels supporting the tank, and a handle to facilitate easy portability of the oil filtering apparatus. A wand assembly is connected with the piping. The wand assembly includes a hose and a wand. A wand housing which is adapted to store the wand and is formed in a portion of the top of the tank. The wand housing is connected with the interior of the tank. A lid is arranged over the top of the tank. The lid includes a latch which is operative to secure it in a closed position.

21 Claims, 4 Drawing Sheets

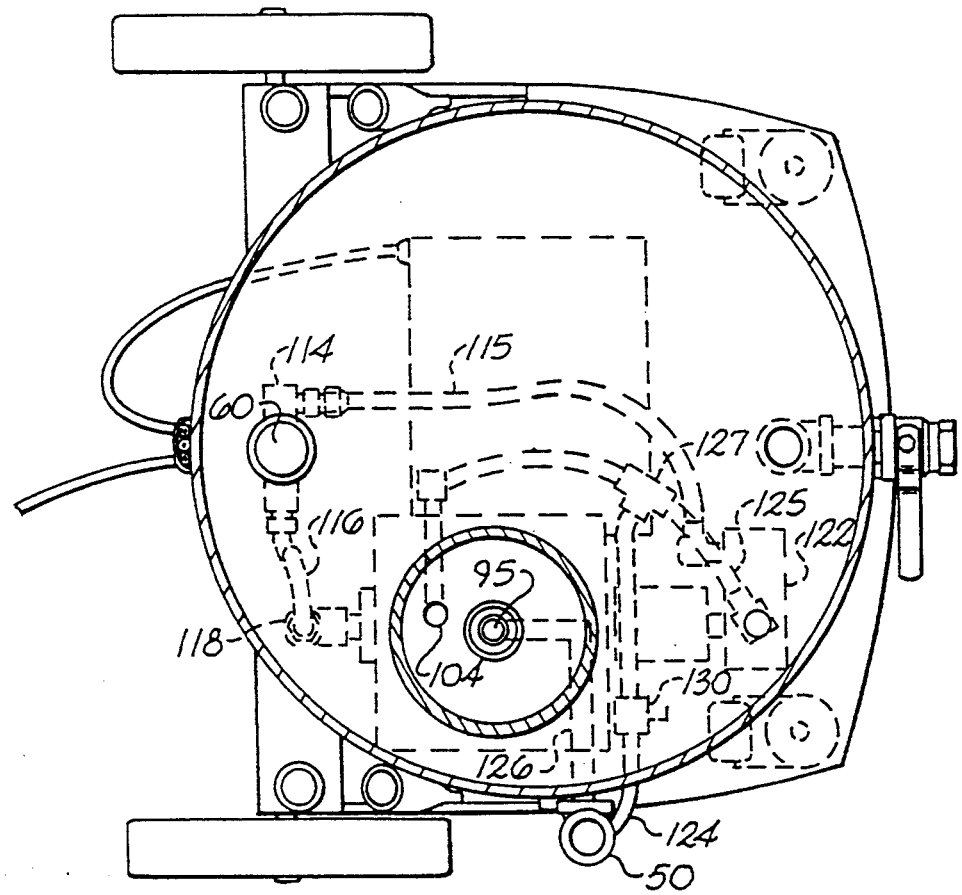
Fig. 3
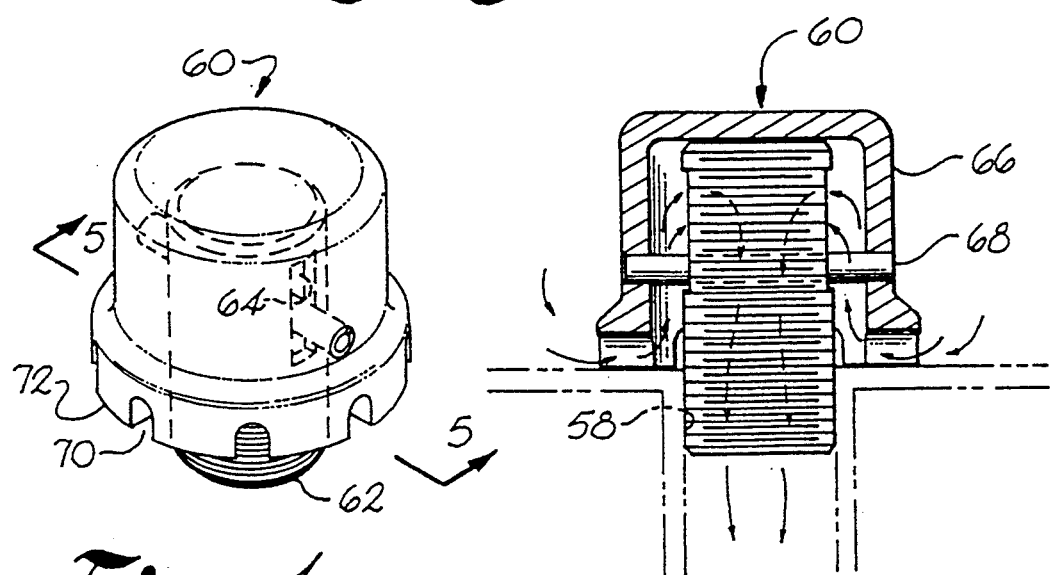
Fig. 4
Fig. 5

PORTABLE COOKING OIL FILTER APPARATUS

BACKGROUND OF THE INVENTION

The present invention relates to a system and method for cleaning cooking oil by filtering. The filtering device of the invention is portable so that it may be easily positioned adjacent to a deep fat cooker when in use, may be used to easily and safely transport cooking oil which must be discarded, and may be easily stored when not in use.

Most restaurants, especially fast food restaurants employ a plurality of large cooking vats or deep fat fryers. The cooking oil in these deep fat fryers becomes dirty after a time as a result of small food particles separating from the food during cooking. This oil must be periodically replaced with fresh oil. In order that the time period between oil replacement may be expanded, it is necessary that the oil be periodically filtered. Also, it is necessary that the deep fat fryer be emptied and cleaned of residue and large food particles.

Recycling oil filter apparatus is known. The devices do not effectively clean the oil so that replacement intervals are relatively short. Also, known devices do not provide means to simultaneously clean the deep fat fryer and the oil. Finally, the known devices do not provide an enclosed transport facility to easily and safely transport dirty oil for disposal.

U.S. Pat. Nos. 2,477,404; 4,444,144; and 4,959,144 show various known portable cooking oil filtering arrangements.

U.S. Pat. No. 2,477,404 is directed to portable oil filter arrangement in which the tank is uncovered, the pump is one directional and does not force the oil through the filter under pressure.

U.S. Pat. Nos. 4,959,144 and 4,444,095 are directed to portable filter systems which are adapted to be housed beneath the cabinet of a deep fat fryer. In the '144 patent, the oil is drained into a reservoir from which it is pumped into a pressure vessel. Here, the oil is forced under low pressure through the filter element and out of the filtering device. The arrangement disclosed in the '095 patent is similar to that just described in that it is received beneath the cabinet of a deep fat fryer.

None of the prior art disclose plural filter systems. Also, none of the prior art is easily transported between deep fat fryers while acting to provide maximum safety for the operator.

Accordingly, it is an object of the invention to provide a filter device for cooking oil which is easily transported.

Another object is to provide a cooking oil filter arrangement having a primary filter and a secondary filter.

Another object of the invention is to provide a portable cooking oil filter arrangement having a lockable lid which facilitates safe transport of the oil.

Another object of the invention is to provide a portable filter arrangement in which a wand is used to remove dirty cooking oil from a deep fat fryer, to wash the fryer down with oil, and to fill the fryer with clean oil.

SUMMARY OF THE INVENTION

A portable cooking oil filtering apparatus for cleaning cooking oil which includes a tank having a top and a bottom, for receiving soiled cooking oil. A pump assembly, which includes a reversible pump and piping connecting with the tank through an opening in the floor thereof. The reversible pump allows pumping of soiled cooking oil into and out of the tank. A frame is provided which includes a pair of wheels supporting the tank, and a handle to facilitate easy portability of the oil filtering apparatus. A wand assembly is connected with the piping. The wand assembly includes a hose and a wand. A wand housing in the top of the tank is adapted to store the wand. The wand housing is connected with the interior of the tank so as to eliminate spillage. A lid is arranged over the top of the tank. The lid includes a latch which is operative to secure it in a closed position.

A primary filter and a secondary filter are connected with the piping and are operative to filter only cooking oil being removed from the tank by the pump.

The filtering apparatus functions in the following manner. The device is transported to a container of soiled cooking oil. The wand is positioned to transport the soiled cooking oil from the container through the piping into the tank upon activation of the pump in a first direction. Upon draining the container, the pump is activated to pump in a second direction which draws the oil from the tank, forces it through the secondary filter, through the piping, through the primary filter and returns it to the container as clean oil.

The tank includes a drain pipe connected with a second opening in the bottom of the tank. An on/off valve is arranged along the drain pipe.

A pre-heater is arranged adjacent the pump. The pre-heater is operative to insure that no congealed oil exist in the piping prior to activating the pump.

A control panel is provided. The control panel contains switches operative to actuate the pump in the first and second directions and to activate the pre-heater.

The secondary filter is arranged inside the tank and is operative to filter only during operation of the pump in the second direction.

The secondary filter comprises a vertically movable filter screen constructed to normally be in contact with the bottom of the tank in a filtering position over the opening in the tank. The filter screen of the secondary filter is raised away from the bottom when the pump is operative in the first direction. The filter screen of the secondary filter is in the filtering position and operative to filter during operation of the pump in the second direction.

The secondary filter includes a threaded tube threaded into the opening. The threaded tube has a pair of vertical slots arranged adjacent one end thereof. A filter screen consisting of a cap having an open end, a closed end and a body portion is mounted over the threaded tube. Grooves are formed in the body portion about the periphery of the open end. A pin passes through the slots and the cap. The arrangement operates so that with the pump pumping in the second direction the open end of the filter screen rest on the bottom of the tank in a filtering position. When the pump operates in the first direction, the filter screen is elevated away from the floor into a non-filtering position by the force of incoming oil.

The secondary filtering means is operative to restrict passage of large particles through the first opening during removal of the cooking oil from the chamber.

The primary filter is contained within a removable canister secured to a foot in the bottom of the tank. The foot is connected with the pumping system. The primary filter is secured in position within the tank so that when oil is pumped out of the tank, it is forced into the primary filter and drawn from the primary filter and out of the portable filtering apparatus canister.

The primary filter includes a filter canister which mounts with a footing member having an inlet opening, a raised vertical shoulder and an elevated first nipple in the center thereof. The nipple comprises an internally threaded outlet opening. The canister includes an open ended cylinder which is adapted to have one end seated about the vertical shoulders. A cap having a partially hollow securing pin extending therefrom, is adapted to be seated in a second end of the cylinder. The securing pin is adapted to be threadably engaged in the nipple to secure the cylinder and cap in position against the footing. A second nipple, including resilient mounting means is slidably arranged on the securing pin adjacent the cap. An opening is formed in an intermediate portion of the securing pin. A filter cartridge which includes filter material arranged about a non-porous tube which has a plurality of apertures formed about its periphery at substantially its midpoint is provided. The tube of the filter cartridge is adapted to be positioned over the hollow pin with the first and second nipples arranged to seal its ends. The arrangement allows oil to be forced into the cylinder through the inlet opening, forced through the filter material and into the interior of the tube as cleaned oil. The oil is then forced into the securing pin and out of the outlet opening.

Conduits connect the pump with the first opening, the primary filter and with a wand/hose assembly. The wand/hose assembly connects with the deep fat fryer to allow the removal and the return of the cooking oil from the fryer. Control means are provided which are operative to drive the pump in a first direction in which cooking oil is pumped into the chamber and a second direction in which the cooking oil is drawn from the chamber through the secondary filter assembly, through the primary filter assembly, and removed from the filtering system.

DESCRIPTION OF THE DRAWING

The construction designed to carry out the invention will hereinafter be described together with other features thereof.

The invention will be more readily understood from a reading of the following specification and by reference to the accompanying drawings forming a part thereof wherein an example of the invention is shown and wherein:

FIG. 3 is a sectional top view of the portable cooking oil cleaning device;

FIG. 4 is a perspective view of the secondary filtering element;

FIG. 5 is a sectional side view of the secondary filtering element taken along lines 5—5 of FIG. 4;

DESCRIPTION OF A PREFERRED EMBODIMENT

Figure 1:
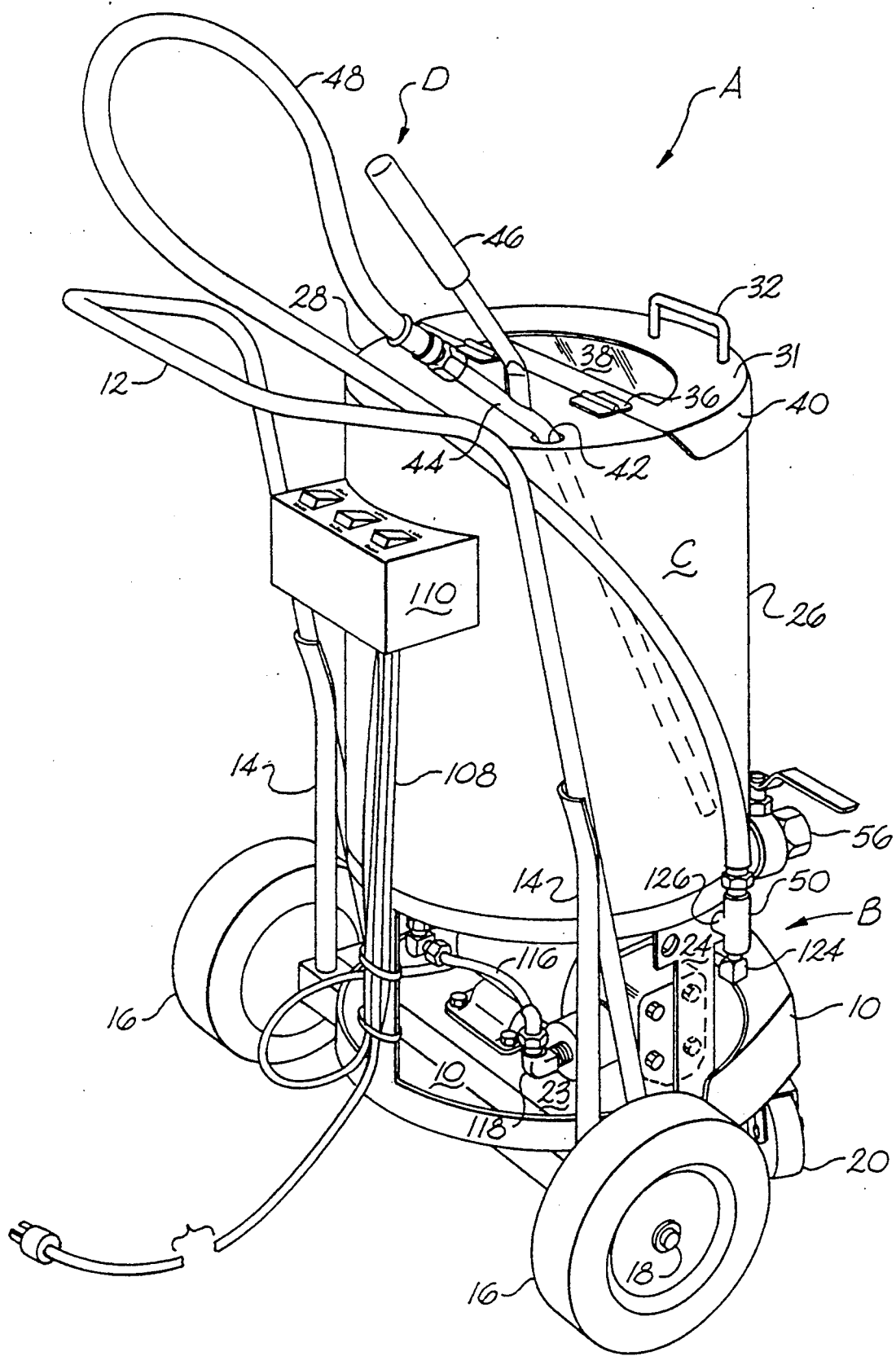
FIG. 1 is a perspective view of the portable cooking oil cleaning device taken from the rear.
Figure 2:
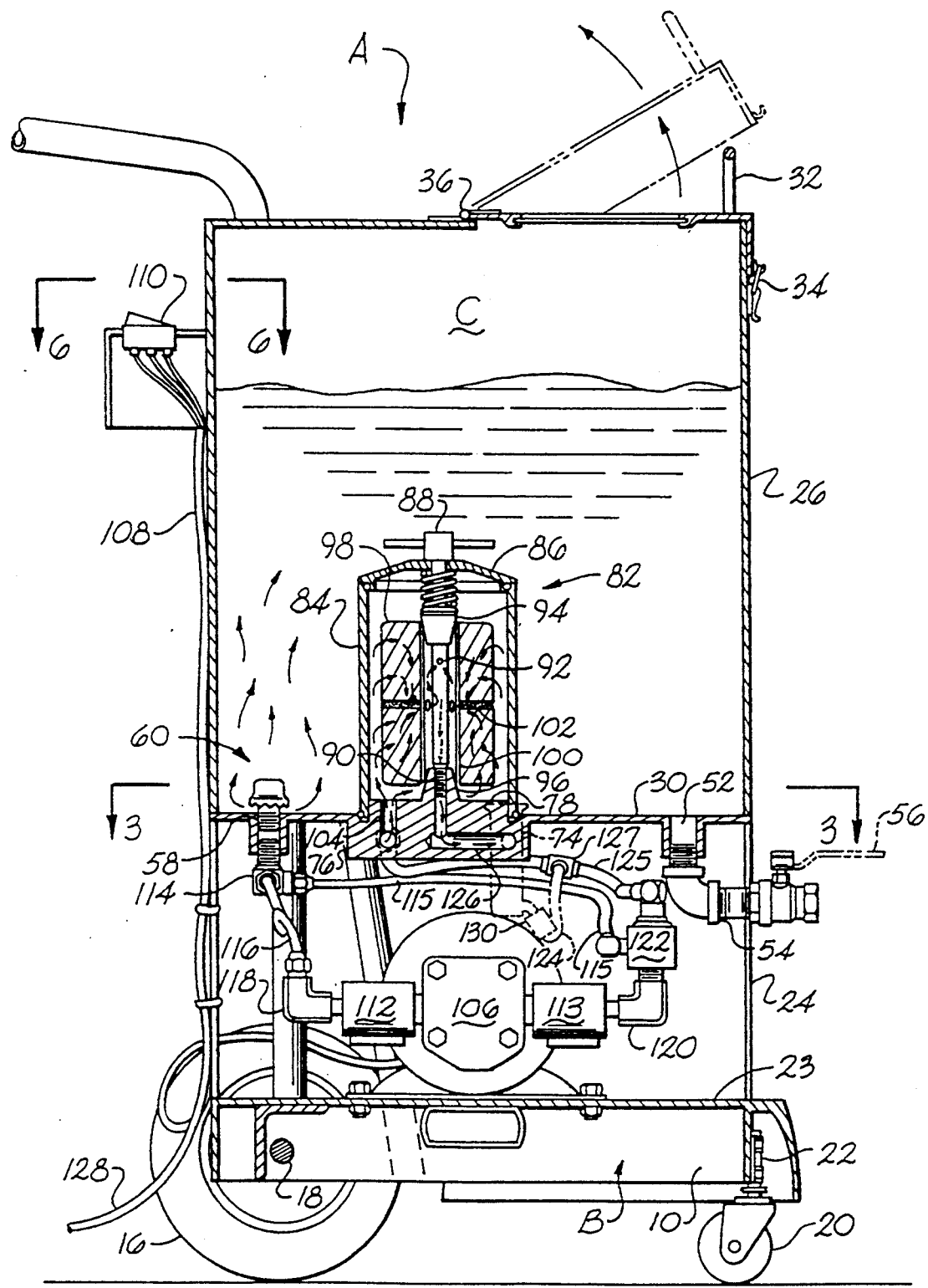
FIG. 2 is a sectional side view of the portable cooking oil cleaning device.

The instant invention is directed to a portable cooking oil filtering device which is designed to prolong the life of the cooking oil and is designated as A. This filtering device is best seen in FIGS. 1, 2, and 3. Portable oil filtering system A is primarily designed for use in fast food establishments for cleaning the cooking oil used in the deep fat fryers. The filtering system also finds use in any type restaurant which cooks with vats filled with cooking oil.

Portable cooking oil filter A includes a frame 10 having an upstanding handle 12 and support rods 14. Frame 10 is provided with a pair of wheels 16 supported by rod 18 which is connected to frame 10 adjacent to support rods 14. A pair of pivotally mounted rollers 20 are mounted to frame 10 by vertical extensions 22. Rollers 20 rotate about the axis of extensions 22 which allows easy change of direction for portable filter A during transport. A support surface 23 is secured with frame 10 to support the pump and piping assembly B which will be later described.

Four vertical extensions 24 extend from frame 10 and support tank C. The tank C is preferably cylindrically shaped and includes a vertical periphery 26, a top 28 and a bottom 30. Top 28 includes a lid 31 which is pivoted midway of the top by hinges 36. Lid 31 has a handle 32 secured thereto to facilitate raising and lowering thereof. Also, a latch 34 is provided to secure lid 31 in locked relationship with the upper edge of periphery 26 and top 28. Lid 31 also includes a transparent plate 38 which allows visual inspection of the interior of the tank and a downwardly directed flange 40 which allows the lid to securely seal with top 28 when latched.

Also formed in top 28 is a wand housing 42 which consists of a tube opening into the interior of tank C. Wand housing 42 is adapted to house wand 44 when the wand/hose assembly D is not in use. Housing 42 retains wand 44 in such a manner that any drainage or drippage therefrom will be delivered into tank C.

Wand/hose assembly D consists of a wand or nozzle 44 having a handle 46. Wand 44 is connected by hose 48 to pump and piping assembly B by a T-joint 50.

Because the cooking oil, when drawn from the deep fat fryer is extremely hot, measures are necessary to ensure the safety of the operator. Four of the features of the portable oil filter A so far described are intended to provide maximum safety. By providing four well spaced wheels 16 and 20 with only one pair being pivotal provides stability, even during movement. The provision of an upstanding handle 12 further increases stability while facilitating ease of portability. Lid 31, when latch in position to seal top 28 closed, prevents spillage resulting from sloshing during movement and also should the tank overturn, it remains closed. Transparent plate 38 allows visual inspection to determine if tank C contains oil. Finally, handle 46 of wand 44 provides insulation from the wand once it becomes heated by the hot oil passing through.

The bottom or floor 30 of tank or canister C is provided with three openings 52, 58 and 74.

Opening 52 receives an L-joint 54 to which an on/off valve 56 is connected. This arrangement is provided function as an oil discarding assembly. In practice, when it becomes necessary to replace the cooking oil, portable cleaning unit A transfers the oil from the deep fat cooker E to tank C. Portable unit A is moved to a station for receiving the discarded oil and valve 56 is opened. The oil is drained out of tank C and discarded. Again, the operator is protected from burns caused by contacting the hot oil.

Bottom 30 of tank C has a second opening 58 formed therein which mounts secondary filtering element 60 and is also connected with pump and piping assembly B. Filtering element 60 (as can best be seen in FIGS. 2, 4, and 5) consists of a threaded tube 62 having one end threaded into opening 58. The opposite end of tube 62 is provided with a pair of spaced slots 64. A cap 66 is retained in position over the upper end of tube 62 by a pin 68 which passes through slots 64. Cap 66 is allowed only limited reciprocal movement due to the interaction of pin 68 and slots 64.

Cap 66 is closed at its upper end and open at its lower end. Vertical grooves 70 are formed about periphery of the lower edge of cap 66. Grooves 70 are separated by planar surfaces 72 which normally rest flush with floor or bottom 30 of tank C. Cap 66 acts as the filter screen of secondary filter member 60. In operation, when the oil is drawn out of tank C by pump and piping assembly B, cap 66 rests firmly on floor 30. Grooves 70 allow the oil to pass into tube 62 and out opening 58 while at the same time filtering out large food particles.

Cap 66 is elevated away from floor 30 by the force of oil coming through pump and piping assembly B and passing through tube 62 and against its closed upper end during filling of tank C. In this position, secondary filter 60 is inoperative to filter the oil.

A third opening 74 best seen in FIGS. 2 and 3 is provided in the approximate center of flooring 30. Opening 74 receives a mounting block 76 with its major portion arranged on the underside of bottom 30. A footing 78 is arranged on the upper surface of block 78 and is provided with an upstanding shoulder 80 about its periphery. A canister 82 is secured to footing 78. The canister consists of an open ended tube 84 and a cap 86. One end of tube 84 fits snugly about shoulder 80 while cap 86 fits snugly over its opposite end. Appropriate ring seals are provided to ensure that the ends are completely sealed. Cap 86 includes a rod 88 which passes through the cap. Rod 88 has a lower threaded end 90 and a hollow interior, for substantially three-fourths its length, to which an inlet aperture 92 is provided. A spring biased reciprocal nipple 94 is provided adjacent the upper end of rod 88.

Footing 78 is provided at its center with a hollow internally threaded nipple 96. A filter element or cartridge 98, which is formed of filter material arranged on an impervious hollow spool 100. Filter element 98 is inserted in canister 82. Spool 100 has a plurality of opening 102 formed about its periphery.

In practice, filter element 98 is positioned in tube 84 with one end of spool 100 arranged over nipple 96. Top 86 is placed over the upper end of tube 84 with rod 88 passing through the tube and nipple 94 arranged in the opposite end of the tube. Rod 88 is threaded into lower nipple 96 by threads 90 causing cap 86 to seal both ends of tube 84 while nipples 94, 96 seal the ends of spool 100. The opening 95 in nipple 96 connects with pump and piping assembly B as does a second opening 104 formed in the upper surface footing 78.

Because canister 82 is located within tank C, the operation of replacing a soiled filter element 98 with a clean one is neat and simple. When canister 82 is disconnected from footing 78, oil and residue within the canister simply spills into tank C where it can easily be disposed of. Also because each forming element of canister 82 is removable individually from tank C there are no obstructions which might hinder cleaning of the tank. Another advantage of the structure of canister 82 is there is no tendency for residue to accumulate in the tank because tube 84 is open ended.

The pump and piping assembly B consists of reversible pump 106 mounted by support surface 23 of frame 10. The pump is connected by wiring 108 to control 110. Control 110 controls pump 106 to pump in a first direction, and a second and opposite direction. Pre-heater mechanisms 112, 113 are connected to each side thereof of pump 106. The pre-heaters 112, 113 which heat the residual oil in the system to approximately 150° F., are actuated by a button of control 110. The heaters ensure that any oil which may be in the pump and piping assembly B is not congealed condition which could clog the system and damage the pump. A T-joint 114 connects with opening 58. Pipe 116 connects T-joint 114 with L-joint 118 which in turn connects with pre-heater 112. Pre-heaters 112, 113 connect with pump 106. Pre-heater 113 then connects with L-joint 120 which connects with pressure release valve 122. Pressure valve 122 connects with pipe 125 which is connected with opening 104 of mounting block 76. Pressure valve 122 is also connected with pipe 115. Pipe 115 forms a safety release which will be described hereinafter.

Pressure valve 122 connects with pipe 124 by T-joint 127 formed in pipe 125. Pipe 124 carries ball valve 130 and is connected with T-joint 50 of wand/hose assembly D. Valve 130 operates as the means to control the flow of oil through the filter canister 82 by closing line 124 and to control the flow of oil away from canister 82 by opening line 126. The position of ball valve 130 is dependant on the direction in which the pump is driven.

The direction of oil flow during filling of tank C is as follows. Viewing FIGS. 1, 2, and 3, valve 130 is opened clearing pipe 126. Wand/hose assembly D is positioned in the tank of deep fat fryer E and control 110 actuates pump 106 to operate in a first direction. The oil is drawn from fryer E through wand/hose assembly D, through T-joint 50, through pipe 124, through pipe 125, through valve 122 and into pump 106. From pump 106, the oil is pushed through pipe 116 and out opening 52 into tank C. There is no oil forced through canister 82 because pressure of between forty and sixty pounds is required to force the oil through filtering element 98. The path just described is substantially open and requires only minimum pressure. When the filtering apparatus A is operating to filter, valve 130 is closed sealing line 124. Pump 106 is controlled to pump in a second direction by control 110. The oil is drawn from tank C through opening 58, pipe 116, pump 106 and is forced through joint 120 to pressure valve 122. From valve 122, the oil is forced through pipe 125, opening 104 and into canister 82. Because valve 130 has closed pipe 125, there is no other passage available for the oil to move. From canister 82, the oil passes through filter cartridge 98 and out opening 95 and through passageway 126 formed in block 76. Passageway 126 connects with T-joint 50 which connects with wand/hose assembly D through which the oil is expelled into deep fat fryer E.

As filter cartridge 98 becomes clogged with food particles from extended use, the pressure required to force the oil through the canister increases. When the pressure exceeds a prescribed maximum, usually sixty pounds, pressure valve 122 opens to line 115 which is also connected to T-joint 114. The oil is now circulated in a circular path through pipe 115, pipe 116, pump 106 and pressure valve 122.

Figure 6:
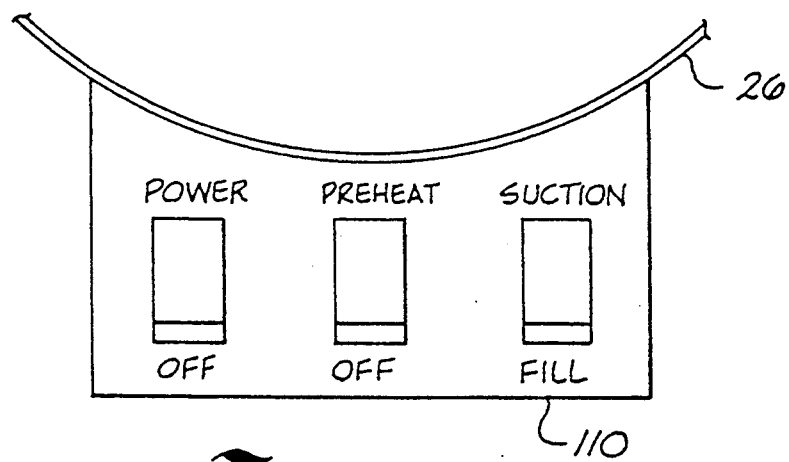
FIG. 6 is a sectional top view of the control panel.

Control 110, as shown in FIGS. 2 and 6 includes a power line 128, an on/off power switch, an on/off pre-heater switch and a suction/fill switch. To operate the pump and piping assembly B, the pre-heat switch is first switched on to activate pre-heaters 112, 113. The direction of motion for pump 106 is decided by setting the suction/fill switch as desired. The power on/off switch is now moved to on.

Figure 7:
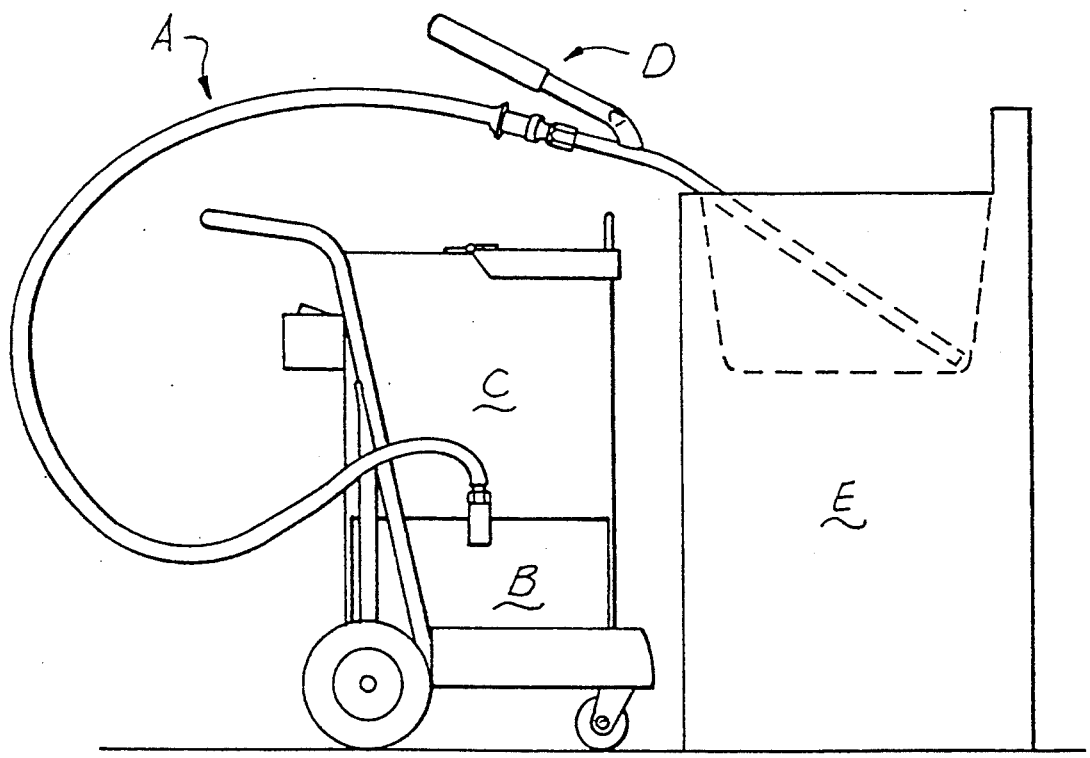
FIG. 7 is a diagrammatic side view of the portable cooking oil filtering device positioned adjacent a deep fat cooker and arranged to transfer the cooking oil. Cap 66 thus acts as the means which allows filter element 60 to filter the oil in only one direction of flow.

The operation of the oil filtering system A will now be described while viewing FIGS. 2, 3, and 7. The oil filtering system A is moved into position adjacent a deep fat fryer E and the wand of wand/hose assembly D is positioned in the vat of deep fat fryer E. Assuming the vat is full of oil to be cleaned, the suction/fill switch will be set to suction. The pre-heater switch will be set to on and the power switch will be set to on.

Upon completion of the removal of the oil from deep fat fryer E, the power switch is moved to off and the suction/fill switch is placed on fill. After the vat of deep fat fryer E has been cleaned, the power switch is switched to on. This activates pump 106 to move the oil from tank C through canister 82 through wand/hose assembly D and back into the vat of deep fat fryer E.

Should the oil need to be discarded, the second phase of the operation would be omitted. The oil filtering system A will be moved to a waste container and the dumping valve 56 used to remove the oil from tank C.

It is contemplated that pressure switch 122 may include an indicator switch which would signal by actuating a visual element indicating that the filter element 98 needed changing when the pressure in the system reached a set limit. Such an indicator would prevent valve 122 from being actuated to merely circulate the oil as earlier described.

While a preferred embodiment of the invention has been described using specific terms, such description is for illustrative purposes only, and it is to be understood that changes and variations may be made without departing from the spirit or scope of the following claims.

What is claimed is:

1. A portable cooking oil filtering apparatus for cleaning cooking oil contained in a cooking container, said portable cleaning apparatus including;
   a reservoir tank including a top, a side wall and a bottom for receiving soiled cooking oil;
   an opening formed in one of said side wall and said bottom;
   a pump assembly including a pump, piping, and a directional valve connecting with said tank through said opening;
   said pump having a first operating direction in which cooking oil is pumped into said tank through said opening and a second operating direction in which said cooking oil is pumped from said tank through said opening;
   a frame supporting said tank, said frame including wheels which facilitate portability of said oil filtering apparatus;
   a primary filter arranged within said tank and connected with said piping;
   said directional valve being operative to divert the flow of said cooking oil away from aid primary filter during operation of said pump in said first direction; whereby,
   said primary filter is operative to receive and filter cooking oil being pumped in only said second direction by said pump.

2. The apparatus of claim 1 wherein; a secondary filter is arranged over said opening.

3. The apparatus of claim 2 wherein; said secondary filter is arranged inside said tank and is operative to filter cooking oil only during operation of said pump in said second direction.

4. The apparatus of claim 2 wherein said secondary filter comprises a vertically movable filter element constructed to normally be in contact with the bottom of said tank in a filtering position over said opening, said filter element of said secondary filter being moved vertically away from said bottom and out of filtering position by the flow of oil during operation of said pump in said first direction and said filter element of said secondary filter being in said filtering position and operative to filter said oil during operation of said pump in said second direction.

5. The apparatus of claim 1 wherein a lid including a locking latch is arranged over the top of said tank and means are provided on said top to pivotally mount said lid.

6. The apparatus of claim 5 wherein said lid includes a transparent section.

7. The apparatus of claim 1 wherein; said directional valve is operative to divert the flow of said cooking oil through said primary filter during operation of said pump in said second direction.

8. The apparatus of claim 1 wherein a wand housing, which stores a wand in communication with said tank, is formed in a portion of said top of said tank.

9. The apparatus of claim 1 wherein said primary filter is removably secured within said tank and means are provided which connect said primary filter with said pump assembly, so that oil pumped in said second direction from said tank is forced through said primary filter prior to being removed from said filtering apparatus.

10. The apparatus of claim 1 wherein said tank includes a drain pipe connected with a second opening in said bottom of said tank, said drain pipe having an on/off valve.

11. A portable cooking oil filtering system for cleaning cooking oil used in a deep fat fryer comprising:
   a substantially cylindrical tank having a floor arranged intermediate its length to form a lower pumping chamber and an upper oil receiving chamber;
   a primary filter assembly and a secondary filter assembly arranged above said floor and within said oil receiving chamber;
   a reversible pump arranged in said pumping chamber and operative to pump oil in a first direction from a deep fat fryer into said oil receiving chamber and to pump oil in a second direction from said oil receiving chamber through said primary and secondary filter assemblies and back into said deep fat fryer;
   a first opening arranged in said floor through which cooking oil passes during filling of said oil receiving chamber from said deep fat fryer and through which said cooking oil passes during removed thereof from said oil receiving chamber to said primary filter for cleaning;
   said secondary filter assembly being operative to allow entry of large particles through said first opening during filling of said oil receiving chamber and said secondary filter being further operative to restrict passage of said large particles through said first opening during removal of said cooking oil from said oil receiving chamber; and control means operative to drive said pump in said first direction in which cooking oil is pumped unfiltered into said oil receiving chamber and in said second direction in which said cooking oil is drawn from said oil receiving chamber through said secondary filter assembly, through said primary filter assembly and removed from said filtering system.

12. The apparatus of claim 11 wherein said secondary filter assembly includes a threaded tube threaded into said opening, said threaded tube, having a pair of vertical slots arranged adjacent one end thereof, a filter element consisting of a cap having an open end and a closed end separated by a body portion, grooves formed in said body portion about the periphery of said open end and a pin mounted intermediate said body portion arranged to pass through said slots; whereby when said pump operates in said second direction the periphery of said open end of said filter element rest on said floor of said tank in filtering position and when said pump operates in said first direction, said filter element is elevated away from said floor of said tank and into a non-filtering position by the force of incoming oil.

13. The apparatus of claim 11 wherein said primary filter assembly includes a canister arranged above said flooring, said canister includes a removable top and an open ended tube;

a disposable filter element is located within said canister;

conduits are provided which connect said pump with said first opening, said primary filter assembly with a wand/hose assembly, whereby;

in operation, said wand/hose assembly forms a connection between said cooking oil of said deep fat fryer and said filtering system which facilitates transfer of said cooking oil from said deep fat fryer to said filtering system and return of said cooling oil to said deep fat fryer.

14. A portable cooking oil filtering apparatus for cleaning cooking oil contained in a cooking oil container, said portable cooking oil filtering apparatus including;

a reservoir tank having a top and a bottom and being operative to receive and dispense soiled cooking oil;

a pump assembly which includes piping having a first operating direction in which soiled cooking oil is forced into said reservoir tank and a second operating direction in which soiled cooking oil is drawn from said tank;

a pre-heater arranged adjacent said pump assembly, said pre-heater being operative to insure that no congealed oil exist in said piping prior to said pump assembly being activated;

a primary filter and a secondary filter arranged in said reservoir tank for filtering said cooking oil; and means associated with said primary and said secondary filter operative to cause said primary and said secondary filter to filter said cooking oil only when said pump assembly is operating in said second direction to remove said soiled oil from said reservoir tank.

15. The apparatus of claim 14 wherein; said primary filter includes a canister secured to a footing formed in said bottom of said reservoir tank, said footing including a vertical shoulder.

16. The apparatus of claim 15 wherein said canister comprises a cap having a depending shoulder arranged about its lower surface and an open ended cylinder adapted to have one end seated about said vertical shoulder and an opposite end receiving said depending shoulder of said cap;

a filter cartridge located within said canister; and means securing said canister with said footing within said reservoir tank.

17. The apparatus of claim 15 wherein means removably secure said canister within said reservoir tank so that upon removal of said canister from said reservoir tank no spillage results.

18. The apparatus of claim 14 wherein a control panel is provided, said control panel containing switches operative to actuation said pump assembly in said first and second directions and to activate said pre-heater.

19. A portable cooking oil filtering apparatus for cleaning cooking oil contained in a cooking container, said portable cooking oil filtering apparatus including:

a reservoir tank including a top and a bottom for receiving soiled cooking oil;

a pump assembly including a pump and, piping connecting with said reservoir tank through an opening;

said pump having a first operating direction in which cooking oil is pumped through said piping into said reservoir tank through said opening and a second operating direction in which said cooking oil is pumped from said reservoir tank through said opening into said piping;

a frame supporting said reservoir tank, said frame including wheels which facilitate portability of said oil filtering apparatus;

a primary filter, arranged within said reservoir tank and connected with said piping;

control means connected with said piping and primary filter, said control means being operative to divert said cooking oil away from said primary filter during operation of said pump in said first operating direction and to divert said cooking oil through said filter during operation of said pump in said second operating directions;

a mounting block carried in said bottom for mounting said primary filter in an upstanding configuration; and said primary filter includes a removable filter element carried in a filter canister, said filter canister having at least one open end which allows said filter element to be removed from said filter canister for replacement thereof with all spillage of residual oil being retained within said reservoir tank.

20. The apparatus of claim 19 wherein said filter canister includes a top, an open ended tube and means securing said top and said mounting block in sealed relationship with said open ended tube.

21. The apparatus of claim 19 wherein said block includes passageways connecting said primary filter with said piping for passage of said oil into and out of said primary filter.

* * * * *